June 5, 1962  H. McGEE  3,038,044
PRESSURE CONTROL APPARATUS
Filed Jan. 8, 1959  3 Sheets-Sheet 1

INVENTOR.
HAROLD McGEE
BY J. F. Cuneo
ATTORNEY

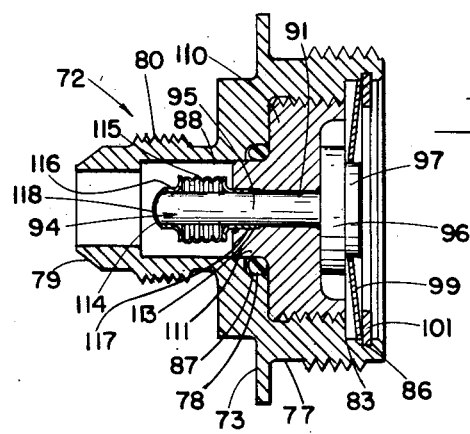

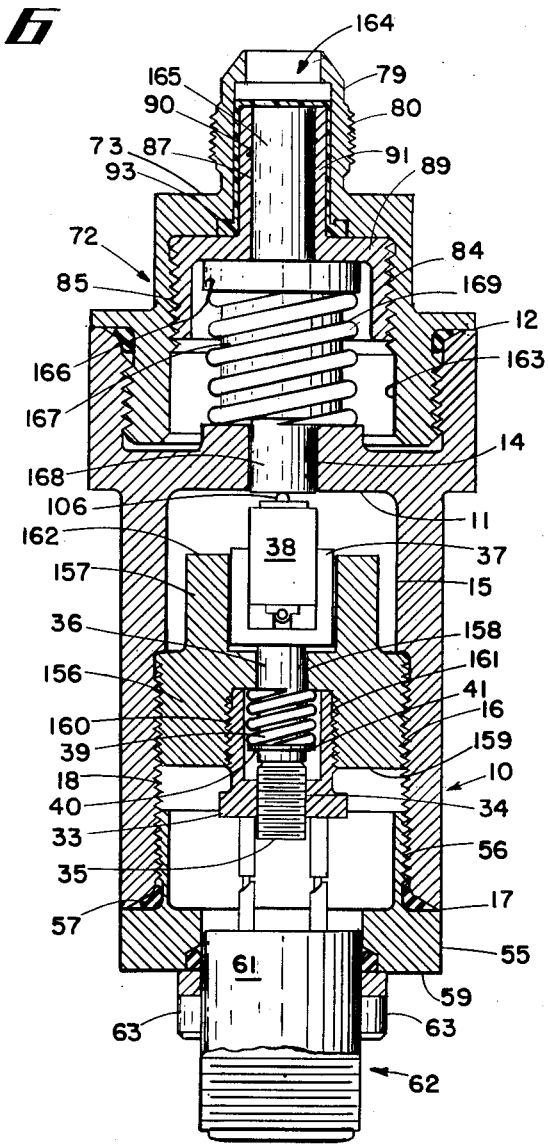

United States Patent Office 3,038,044
Patented June 5, 1962

3,038,044
PRESSURE CONTROL APPARATUS
Harold McGee, 3903 N. Shadydale St., West Covina, Calif.
Filed Jan. 8, 1959, Ser. No. 785,732
12 Claims. (Cl. 200—83)

This invention relates to fluid pressure actuated control equipment and in particular to an accurate fluid-pressure actuated electrical switching apparatus in which the cut-in or cut-out pressures can be accurately adjusted.

Fluid-pressure responsive control devices are required in numerous operations and a variety of devices have been proposed, however, in a number of present day operations, extremely close control of the pressure is often necessary. In some instances the pressure controling element is to be subjected to drastic operational conditions, such as amplified vibration, rapid acceleration, etc., and under such conditions most of the known devices have proven unsatisfactory, being frequently rendered inoperative.

Also in many of the available devices, the pressure sensing elements of the instruments are subject to mechanical hysterisis that eliminates the possibility of close adjustment. In other applications that are becoming more frequent in occurrence, the pressure controlling devices must be subjected to extremely low temperatures for extended periods of time. Examples of this type of operation are encountered in liquified gas systems, or in those applications where the controller is subjected to the cold of outer space. At these low temperatures the pressure sensing elements either operate erratically or fail completely.

My invention makes available an improved, compact form of fluid-pressure actuated control switch that is capable of very close calibration and will effectively maintain the pressure within the desired limits. This has been the case even though the controlling device was subjected to severe vibrational stresses for a prolonged period; repeatedly cycling the instrument undergoing vibrational stresses shows substantially no variation in the pressures at which cut-in and cut-out occurs. The apparatus is furthermore designed to render it exceptionally free from the effects of mechanical hysterisis. Particular features of the device are its extreme accuracy, simplicity, compactness of construction, ease of adjustment and repair, and the replaceability of the sensing element with stronger or weaker elements that permit the instrument to be used over a wide range of operations.

A purpose of this invention is to provide a new and improved pressure controlling switch that is accurate, simple in construction, compact, easy to manufacture and repair, will remain in adjustment under adverse conditions, and in which the fluid-pressure sensing element is not materially affected by mechanical hysterisis.

Another purpose of this invention is to provide a fluid-pressure control apparatus that cannot be damaged by surges of pressure and when exposed to such surges in pressure will remain in adjustment. The apparatus can furthermore be subjected to pressures greatly in excess of its established capacity without damaging the apparatus.

A further purpose of this invention is to provide a fluid-pressure controlling device that can be used in a system where the pressurized fluid contains abrasive particles, or is a corrosive fluid, without damaging the apparatus, there being no moving parts of the device proper that are exposed directly to the pressurizing fluid.

An added purpose of this invention is to provide a fluid-pressure activated controlling device that will perform satisfactorily when undergoing mechanical stresses such as exposure to high amplitude vibration or rapid acceleration for prolonged periods of time.

Another purpose of this invention is to provide a fluid-pressure actuated controlling device that will operate satisfactorily at low temperatures such as may be encountered in outer space or in liquified gas systems.

A further purpose of this invention is to provide a fluid-pressure controlling device in which the cut-in and cut-out pressures can be selected and accurately adjusted to obtain the correct operating pressures.

A further purpose of this invention is to provide a fluid-pressure controlling device wherein the pressure sensing element can be quickly and easily changed for another element suitable for the particular pressure that it is desired to control.

Further objects and features of the present invention will become apparent from the following detailed description with reference being made to the accompanying drawings in which:

FIGURE 2 is a sectional view of a modified form of pressure sensing unit adapted to be substituted for the one shown in FIGURE 1.

FIGURE 3 is an alternative type of pressure sensing element that may be substituted for the one shown in FIGURE 1.

FIGURE 4 is an isometric view of the washerlike spring shown in FIGURE 1 for biasing the pressure responsive part of the sensing unit.

FIGURE 5 is a schematic representation of the manner in which the electrical elements of a controlling device such as shown in FIGURE 1, with the relay system.

FIGURE 6 is a sectional view of an alternative construction showing a pressure controlling device in which one snap switch is employed in place of the two snap switches shown in FIGURE 1.

Figure 1:
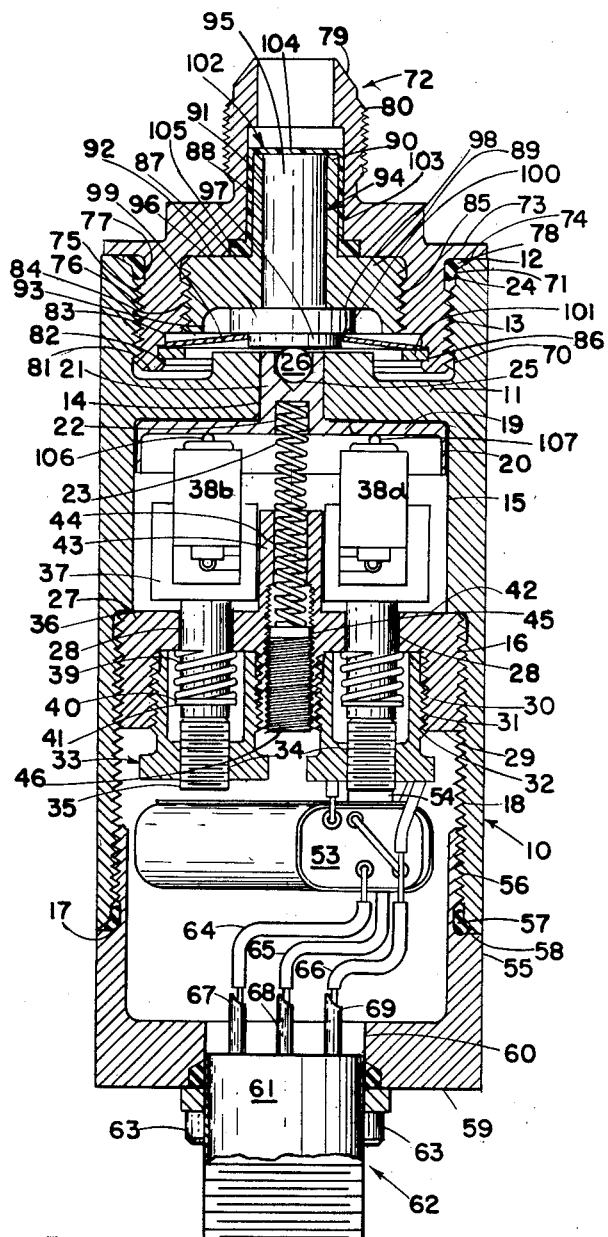
FIGURE 1 is a sectional view of a preferred embodiment of this invention.

Referring to the drawings, the preferred embodiment of pressure controlling device shown in FIGURE 1, comprises a hollow body 10 having a partition 11 that extends transversely to the longitudinal axis of the body at a position located near end 12 of the hollow body. The internal surface of body 10, between partition 11 and end 12 is provided with threads 13; partition 11 has a centrally positioned axial bore 14. That portion 15 of hollow body 10, located near the center of the body member between partition 11 and enlarged bore 16 is smooth and forms a cylindrical wall. The diameter of enlarged bore 16 is uniform from the point of enlargement to end 17 of the body, and is provided with internal threads 18 that extend substantially the entire length of bore 16, the threads being omitted for a short distance at either end to form an O-ring receiving surface 24 at one end and a thread relief at the other end.

A switch push button contacting member in the form of a piston 19 has a short skirt 20 that is adapted to slide snugly in cylindrical portion 15 of the body; the head of piston 19 is normally against partition 11 when no pressure is acting against the piston stem 21 that is centrally disposed on the head of the piston and is preferably integral with the head. Stem 21 has a diameter that is adapted to permit it to slide snugly in bore 14. The opposite side of the head of piston 19 is provided with a shallow axially positioned circular depression 22 that is smaller in diameter than stem 21. Depression 22 receives and centers one end of a biasing element 23 such as the coil spring shown in FIGURE 1. The end of stem 21 is provided with a shallow bore 25 that has a preferably tapering bottom and is of a diameter sufficient to snugly receive ball 26.

A threaded supporting member 27, adapted to engage threads 18 of bore 16, comes to rest against a shoulder formed by the end of cylindrical surface 15 and the beginning of enlarged bore 16. Supporting member 27 has a pair of symmetrically positioned, smooth bores 28 that are preferably located on opposite sides of the central longitudinal axis, on a diameter. Bores 28 are counterbored for a suitable distance from end 29 of supporting member 27, to form larger bores 30 that are provided with internal threads 31. Threads 31 engage external threads 32 of an annular packing type of nut 33 that has an axial bore 34 extending through the head portion thereof. Bore 34 is smaller in diameter than the diameter that is formed by the central hollow portion of the packing nut and is threaded to receive an adjusting screw 35.

Both bores 27 are fitted with cylindrical shafts 36 that slide snugly therein. When in position one end of shaft 36 rests against its respective set screw 35 and the other end of the shaft supports a yoke 37. Each yoke 37 is adapted to securely hold a snap switch 38 that is similar to the type of switch known as a "microswitch." In FIG. 1 the snap switches are used as single pole single throw switches. A coil spring 39 surrounds shaft 36, one end of the spring rests against the bottom of counterbore 30 and the other end of the spring bears against snap ring 40, seated in a circumferential groove 41 in shaft 36. The spring biases shaft 36 and yoke 37 in the direction of surface 42 of supporting member 27 to whatever extent is permitted by set screw 35.

The end of supporting member 27, from which bores 28 begin, is provided with an integral, centrally positioned annular member 43 that extends a distance into the space surrounded by smooth cylindrical surface 15 of body 10 whenever supporting member 27 is resting against the shoulder. Inner diameter 44 of annular member 43 is large enough to accommodate the other end portion of biasing spring 23 and the bore continues through to end 29 of bore 44 of supporting member 27. Portion 45 of bore 44 adjoining end 29 is threaded for a distance to receive adjusting screw 46; by varying the position of adjusting screw 46 it is possible to regulate the biasing force of spring 23 against piston 19.

A relay 53 is supported in hollow body 10 between mounting member 27, when this member is in place, and end 17 of the body. This relay may be attached to supporting member 27 by any suitable means such as bolts 54. In some applications it may be preferred or necessary that relay 53 be omitted from the circuit, in this event that portion of body 10 normally occupied by the relay would be left empty.

A cap 55 having external threads 56 is adapted to engage internal threads 18. Threads 18 are omitted for a short distance at the inner end to form a smooth surface. Cap 55 is sealed to body 10 by means of an O-ring 57 that seats in the space formed by this last smooth surface and threadless portion 24 of body 10, and is squeezed tightly in the space so formed when the shoulder portion 58 of cap 55 is snugly against end 17 of body 10.

Wires from snap switches 38 to the terminals of the relay pass through suitably located openings (not shown) that pass through supporting member 27. End portion 59 of cap 55 has a preferably centrally located bore 60 that is large enough to accommodate a plug-in insulator portion 61 of a conventional electrical connector unit 62. The body of connector 62 is secured to end 59 of cap 55 by any suitable means such as cap screws 63. Wires 64, 65, and 66 connect relay terminals to the plug terminals 67, 68, 69.

A portion of threads 13 are likewise omitted for a short distance from each end thereby forming a thread relief at one end designated as 70 and a smooth O-ring engaging surface 71 at the opposite end.

Another caplike housing member 72 houses the pressure sensing unit of the switching device. Caplike housing member 72 comprises an end portion 73 that has a maximum diameter corresponding substantially to the outer diameter of body 10. End portion 73 continues at uniform diameter for a short distance and then abruptly reduces in diameter to form a shoulder 74. A surface 75 of uniform diameter extends from the base of shoulder 74 and is provided with threads 76 adapted to engage threads 13. Threads 76 are omitted for a short distance from shoulder 74 to form a smooth O-ring engaging surface 77 that cooperates with surface 71 to form an O-ring groove when shoulder 74 of the housing member is against end 12 of body 10. An O-ring 78 is squeezed between smooth surface 71 of body 10 and surface 77 and seals this portion of the pressure controlling device.

Housing member 72 is provided with a centrally positioned pressure tap 79 that extends outwardly from end portion 73. Pressure tap 79 is equipped with suitable external threads 80 to permit connection of the apparatus to a pressurized line (not shown). End 81 of housing member 72 is provided with a bore 82 that is somewhat smaller in diameter than the root of threads 76 and extends inwardly from end 81 a short distance to a point 83 where the diameter again abruptly reduces in diameter forming a smaller bore 84. Bore 84 continues from point 83 to approximately the position of the transverse plane passing through shoulder 74. Bore 84 is provided with internal threads 85 while bore 82 has a snap-ring groove 86 positioned near end 81. The diameter of bore 84, at the end of threads 85 reduces abruptly to a smaller diameter forming a third bore 87 that extends into end portion 73 of caplike housing member 72 for a short distance. At the end of bore 87 the diameter again reduces abruptly forming a fourth bore 88 of smaller diameter that extends a substantial distance into pressure tap 79. The passageway to the end of pressure tap 79 is continuous with bore 88 but is preferably somewhat smaller in diameter.

A preferred form of pressure sensing unit that fits into caplike housing 72 is illustrated in FIG. 1. Threaded bore 84 is fitted with a correspondingly threaded cylindrical mounting member 89 that engages threads 85 and when in place extends substantially from the beginning of bore 84 to the beginning of smaller bore 87. A preferably annular member 90 extends axially from the end of mounting member 89 that adjoins bore 87, and enters bore 88 a substantial distance. The outer diameter of extension 90 is smaller than the diameter of bore 88. Both mounting member 89 and annular extension 90 are provided with an axial bore 91 of uniform diameter. End 92 of mounting member 89 through which bore 91 extends is counterbored for a short distance 93 to a diameter that is smaller than the root of threads that engage threads 85.

A piston 94 comprises a stem 95 that is adapted to slide snugly in axial hole 91; this stem has one end that is normal to the longitudinal axis of the piston. The other end of stem 95 supports an enlarged cylindrical portion 96 that continues at uniform diameter for a short distance and then reduces abruptly in diameter to form a short cylindrical portion 97 and a shoulder 98. A washerlike frusto conical disc spring 99, often referred to as a "Belleville Spring," has a round central hole 100 that slips around short cylindrical portion 97 of the piston and comes to rest against shoulder 98. The larger end of conical disc spring washer 99 bears against snap-ring 101 that is seated in groove 86, and serves to bias piston 94 toward pressure tap 79. Since the diameter of cylindrical portion 97 is greater than that of bore 14 in partition 11, and cylindrical portion 97 extends when in its biased position to within a short distance of partition 11, this effectively limits the travel of the piston.

To prevent any foreign matter from entering piston 94 area and also to prevent any pressure from building up behind the piston, a resilient cap 102 made of flexible material such as rubber, Teflon, or similar plastic having a sleeve portion 103 is employed. Sleeve portion 103 is closed at one end with a circular piece 104. The inner diameter of sleeve 103 is adapted to fit tightly against the external surface of extension 90 and the outer diameter of sleeve 103 is adapted to fit tightly against the wall of bore 88. The other end of sleeve 103 is open and provided with an external annular enlargement 105 that has an outer diameter corresponding to the diameter of short bore 87; the annular portion is slightly longer than the depth of bore 87. When cylindrical mounting member 89 is tight against the end of bore 87, annular enlargement 105 becomes tightly wedged in the groove formed by piston stem 85 and bore 87 so that any foreign matter or pressure working its way past the end of sleeve 103 cannot enter the housing containing the sensing unit.

The lower surface of cylindrical portion 97 rests against ball 26 and as stem 95 is forced inwardly by fluid under pressure, it causes the piston 19 and skirt 20 to slide on surface 15 and in so doing presses the switch contacting portion of the piston against the contact push buttons 106 and 107 of snap switches 38. As pointed out above the movement of portion 97 of the piston 94 is limited to a short travel therefore any surges that occur in the pressure line cannot cause large displacement of the piston and this prevents the customary damage to the instrument that normally occurs.

FIGURE 2 shows an alternative pressure transmitting combination that may be used as the pressure sensing unit. In this arrangement the caplike housing member 72 is constructed substantially in the same manner as the one shown in FIGURE 1, the principal difference being in the sealing element. Cylindrical mounting member 110 resembles mounting member 89 with the exception that it is provided with a short annular projection 111 that extends just a short distance beyond bore 87 of the caplike housing when mounting member 110 is in position. An O-ring is squeezed between the walls of bore 87 and annular projection 111 and this seals that portion of the assembly. Stem 95 of piston 94 is adapted to slide snugly in axial hole 91 as before, however, that portion of bore 91 that lies in cylindrical end portion 111, is counterbored to a slightly larger diameter 113. The end portion 114 of stem 85 is surrounded by a bellows 115 that has sleeve portions 116 and 117 extending from either end of bellows 115. The upper sleeve portion 116 has a circular closure piece 118 that rests against the end of stem 95. The lower sleeve 117 surrounds stem 95 and fits into counterbore 113. Its outer surface is sealed to the counterbore by any suitable means such as a plastic resin, solder, etc. This leaves the expandable portion of the bellows within bore 88 and free to move as the stem of the piston travels in and out. This sealed bellows keeps out all foreign matter and prevents pressure from building up within the unit.

The remainder of the pressure sensing combination shown in this modification is essentially the same as that described in FIG. 1.

FIGURE 3 shows another form of pressure transmitting and sensing unit. In this embodiment caplike housing member 120 has the same outer configuration as caplike housing 72 with the exception that it is provided with a pressure tap 121 having a uniform bore 122. End 123 of the housing member has a bore 124 that is just short in diameter to the diameter of the base of external threads 80 and extends inwardly a short distance. From the end of bore 124, housing member 120 is provided with a smaller bore 125 that continues to a point corresponding to the plane passing through shoulder 74 where it contacts bore 122. At the position where bore 125 begins, housing member 120 is provided with an annular groove 126 that has a maximum diameter corresponding to the diameter of bore 124 and an inner diameter that is larger than the diameter of bore 125. Groove 126 extends into housing member 120 a short distance and forms an annular shoulder 127 against which diaphragm 128 rests. Diaphragm 128 is circular in outline and has a plurality of concentric waves 129. The flat outer rim of diaphragm 128 is secured to a ring 130 by means of welding, soldering, etc., and the outer diameter of ring 130 corresponds to the diameter of bore 124. Ring 130 with the attached diaphragm is secured to the lower end of bore 124 by means of welding, soldering, etc. The outer rim of the diaphragm is at rest against annular shoulder 127 when the unit is assembled.

FIGURE 5 is a schematic wiring diagram of the elements shown in FIGURE 1. In this diagram snap switch 38a represents the switch that remains closed until the pressure exceeds the maximum pressure, and snap switch 38b represents the switch that remains closed only when the pressure in the system falls below the lowest pressure allowable.

Terminal 69 of the connector is the terminal through which current enters the system. Terminals 67 and 68 are the negative terminals. Terminal 69 is connected by wire 66 to terminal 135 of snap switch 38a. As long as the pressure in the system remains below the maximum pressure allowable, contact strip 136 will remain in contact with snap switch terminal 137 but when the pressure reaches the maximum limit, snap switch 38a opens and contact strip 136 will swing to contact stop 138 and no current can flow. Terminal 137 is connected by wire 139 to junction 140. A wire 141 connects junction 140 to terminal 142 of contact strip 143 of normally open relay 53. Another wire 144 leads from junction 140 to terminal 145 of snap switch 38b. Contact strip 146 remains in position against terminal 147 of switch 38b as long as the pressure in the system is at or below the lowest pressure setting. So soon as the pressure rises above that point switch 38b opens and its contact strip rests against stop 148. Terminal 147 of switch 38b is connected by wire 149 to junction 150. Wire 65 leads from junction 150 to the negative terminal 68 of the connector and a second wire 151 leads from junction 150 to terminal 152 of relay 53. A wire 153 leads from terminal 152 to one terminal of solenoid 154 and wire 64 connects the other terminal of solenoid 154 to the other negative terminal 67 of the connector.

When no relay is used and the pressure controlling device uses two snap switches, both switches are acted upon by the piston 19 but each switch would be independently connected to the proper taps on the connector.

The operation of the apparatus shown in FIGURE 1 is as follows: When the system is under no pressure both snap switches 38a and 38b are closed and contact strips 136 and 146 connect terminals 135 and 145 with terminals 137 and 147 respectively. In this position current will flow from connector terminal 69 through wire 66, contacts 135 and 137 of switch 38a, via wire 139 to junction 140. The current then flows through wire 144 into contact 145 of switch 38b, across contact strip 146 to terminal 147 of the switch and through wire 149 to junction 150. From junction 150 the current flows through wire 151 to terminal 152 of the normally open relay 53 and from terminal 152 through wire 153 into solenoid 154 pulling contact strip 143 into closed position, allowing current to flow through wire 141 and into terminal 142 across contact strip 143 and to terminal 152 of the relay. The current leaving solenoid 154 flows through wire 64 to reach negative terminal 67 of the connector.

As soon as the pressure rises above the limit for which snap switch 38b has been set, contact strip 146 moves to stop 148 interrupting the current through wire 149 and 151, however, since connector strip 143 of relay 53 is closed, current will continue to flow through solenoid 154 from line 141, through terminals 142 of the switch and 152 of the relay, through solenoid 154 and into terminal 67 of the connector.

When the pressure in the system exceeds that for which the snap switch 38a has been set, contact strip 136 swings from terminal 137 to stop 138 opening the circuit, and since no current can flow into line 139, solenoid 154 becomes deenergized and relay contact strip 143 resumes its normal position against stop 155 and the pressure producing source is stopped as long as the pressure remains above the lowest pressure for which the control apparatus is set. When the pressure drops below the maximum pressure setting, contact strip 136 of switch 38a closes, connecting terminal 135 with terminal 137 but since switch 38b is open and relay 53 is also open, no current can flow until the pressure drops below the pressure setting of switch 38b. When this occurs switch 38b closes, and the operation set forth above is repeated.

FIGURE 6 shows an alternative embodiment of the fluid pressure control unit that utilizes a single snap switch of the double pole double throw type and does not employ a relay. This pressure controlling apparatus does not differ greatly in outer appearance from the apparatus of FIGURE 1 and comprises a body 10 having partition 11 located near end 12 as before. The internal surface between partition 11 and end 12 is likewise provided with threads 13 and partition 11 has an axial bore 14. Since the body houses only one snap switch 38 and no relay, that portion of body 10 between partition 11 and end 17 can be made considerably smaller in diameter than the one shown in FIGURE 1. Likewise piston 19 is eliminated since there is only one push button and this can be centrally located so that it is acted upon directly by the moving member of the pressure sensing unit. Body 10 has an enlarged bore 16 that is threaded with threads 18 and the threads are again omitted for a short distance at either end to permit seating of an O-ring as before and for a thread relief.

A cylindrical threaded supporting member 156, adapted to engage threads 18, is threaded into the body member until it is against the shoulder former by enlarged threaded bore 16. Supporting member 156 is preferably provided with an extension 157 that reaches into portion 15 of the body and is smaller in external diameter than the smooth surface 15. Supporting member 156 is provided with an axial bore 158 that is counterbored from end 159 to form an enlarged hole 160 having internal threads 161. An annular packing-type of nut 33 engages threads 161, the head of the nut is provided with a bore 34 that is threaded to receive adjusting screw 35 as before.

Bore 158 is fitted with a cylindrical shaft 36, one end of the shaft rests against adjusting screw 35 and the other end supports a yoke 37. From end 162 of supporting member 156, bore 158 is counterbored for a depth sufficient to permit it to surround yoke 37 and thus give it additional support. A single snap switch 38 is held in yoke 37. Cylindrical shaft 36 is also fitted with a snap-ring groove 41 and a snap ring 40 that receives one end of biasing spring 39 as described in FIGURE 1. The other end of the spring rests against the bottom of enlarged hole 160. Threads 18 also receive a caplike member 55 having external threads 56 that engage threads 18. Caplike member 55 is supplied with a suitable connector and sealed to body 10 in the same manner as described in FIGURE 1.

A caplike housing member 72, substantially the same as the one described in FIGURE 1, houses the pressure sensing unit. The main difference is that bore 163 is slightly longer in this embodiment than bore 82 and does not have the snap-ring groove as in FIGURE 1. Caplike housing 72 has a bore 84 with internal threads 85 and a bore 105 that extends into end portion 73 of this housing for a short distance. This housing is also provided with a fourth bore of smaller diameter that extends a substantial distance into tap 79 as before.

The pressure sensing unit in this modification also comprises a threaded cylindrical mounting member 89 that engages threads 85 and extends substantially from bore 84 to the end of bore 87 as before. Mounting member 89 has extension 90 provided with a longitudinal bore 91 of uniform diameter and is also provided with a counterbored portion 93. A piston 164 comprises a stem 165 adapted to slide snugly in hole 91. The upper end of stem 165 is normal to the axis of the piston and the other end of the stem supports a concentric enlarged cylindrical portion 166 similar to cylindrical portion 96 in FIGURE 1. Below cylindrical portion 166, the diameter reduces slightly and continues at diameter 167 to a position just short of the upper surface of partition 11 when cylindrical portion 166 is against the end of counterbore 93 and caplike housing 72 is against end 12 of the body. Beyond reduced portion 167 the diameter of the piston again reduces abruptly forming a cylindrical portion 168 that is adapted to slide snugly into bore 14 of partition 11 and this member extends for a distance slightly longer than the length of bore 14. A biasing spring 169, in this modification a coil spring, seats around cylindrical portion 167 and the ends of the spring rest against partition 11 and against the shoulder formed between cylindrical portions 166 and 167. Cylindrical portion 168 contacts the push button 106 of the single snap switch 38.

I claim:

1. A fluid pressure responsive apparatus comprising: a body member having a transverse partition near one end thereof; a switch push-button contacting member within said body member, said switch push-button contacting member being slidably supported by said partition; spring means associated with the switch push-button contacting member and said transverse partition adapted to bias said switch push-button contacting member in a direction away from said partition when no fluid pressure is acting on the pressure sensitive switch; a supporting member within said body between the partition and the opposite end of the body member; a switch supporting means, said switch supporting means being slidably mounted in said supporting member; means associated with said switch supporting means and the supporting member for biasing the switch supporting means in the direction of said supporting member; means associated with said switch supporting means and the supporting member for adjusting the axial position of said switch supporting means with respect to the supporting member; a snap switch secured to the switch supporting means, said switch having a push-button adapted to be contacted by the switch push-button contacting member; a caplike housing having a pressure tap connection and adapted to engage and close the end of the body nearest said partition; a fluid pressure sensing unit within said housing including a pressure responsive member, said pressure responsive member being in contact with the switch push-button contacting member; a caplike member adapted to engage and close the end of the body remote from said partition; and wires leading from said snap switch to the exterior of said pressure sensitive switch.

2. A fluid pressure responsive apparatus according to claim 1 wherein the caplike member is provided with an electrical connector secured thereto, and wires from the terminals of said snap switch connect to the terminals of said electrical connector.

3. A fluid pressure responsive apparatus comprising: a body member having a transverse partition near one end thereof; a switch push-button contacting member within said body member, said switch push-button contacting member being slidably supported by said partition; spring means associated with the switch push-button contacting member and said transverse partition adapted to bias the switch push-button contacting member in a direction away from said partition when no fluid pressure is acting on the pressure sensitive switch; stop means on said switch push-button contacting member adapted to engage said transverse partition to limit the longitudinal movement of said switch push-button contacting member; a supporting member within said body between the partition and the opposite end of the body member; a switch supporting means, said switch supporting means being slidably mounted in said supporting member; means associated with said switch supporting means and the supporting member for biasing the switch supporting means in the direction of said supporting member; means associated with said switch supporting means and the supporting member for adjusting the longitudinal position of said switch supporting means with respect to the supporting member; a snap switch secured to the switch supporting means, said snap switch having a push-button adapted to be contacted by the switch push-button contacting member; a housing having a pressure tap connection and adapted to engage and close the end of the body nearest said partition; a fluid pressure sensing unit within said housing, including a pressure responsive member, said pressure responsive member being in contact with the switch push-button contacting member; and electrical connection leading from said snap switch terminals to the exterior of said body member.

4. A fluid pressure responsive switch comprising: a body member having a transverse partition near one end thereof; a switch push-button contacting member within said body member, said switch push-button contacting member being slidably supported within said body by said partition; a supporting member located within said body between the partition and the opposite end of the body member; spring means associated with the switch push-button contacting member and the supporting member adapted to bias the switch push-button contacting member in the direction of said transverse partition; a first and a second switch supporting means said first and second switch supporting means being individually and slidably mounted in said supporting member; individual spring means being associated with each switch supporting means and with the supporting member for biasing the first and second switch supporting means in the direction of the supporting member; means associated with each of the first and second switch supporting means adapted to separately adjust the longitudinal position of each switch supporting means with respect to the supporting member; a first snap switch secured to the first switch supporting means; a second snap switch secured to the second switch supporting means, said first and second snap switches having a push-button adapted to be contacted by the switch push button contacting member; a housing having a pressure tap connection and adapted to engage and close the end of the body nearest to said partition; a fluid pressure sensing unit within said housing, including a pressure responsive member, said pressure responsive member being in contact with the switch push-button contacting member; a closure member adapted to engage and close the end of the body member remote from said partition; and electrical connections leading from the terminals of the first and second snap switches to the exterior of said body member.

5. A fluid pressure responsive switch according to claim 4 wherein the supporting member is provided with means for adjusting the force exerted by said biasing spring means against the switch push-button contacting member.

6. A fluid pressure responsive switch according to claim 4 wherein the first and second snap switches are normally closed switches, said switches being connected in series with each other; a normally open holding relay, one terminal of said normally open holding relay being connected in series with the normally closed contact point of the first snap switch, the other terminal of said normally open holding relay being connected in series with the normally closed contact point of the second snap switch.

7. A fluid pressure responsive switch comprising: a body member having a transverse partition near one end thereof; a switch push-button contacting member within said body member, said switch push-button contacting member being slidably supported within said body by said partition; a supporting member located within said body between the partition and the opposite end of the body member; spring means associated with the switch push-button contacting member and the supporting member adapted to bias the switch push-button contacting member in the direction of said transverse partition; a first and a second switch supporting means said first and second switch supporting means being individually and slidably mounted in said supporting member; individual spring means being associated with each switch supporting means and with the supporting member for biasing the first and second switch supporting means in the direction of the supporting member; means associated with each of the first and second switch supporting means adapted to separately adjust the longitudinal position of each switch supporting member with respect to the supporting member; a first snap switch secured to the first switch supporting means; a second snap switch secured to the second switch supporting means, said first and second snap switches having a push-button adapted to be contacted by the switch push-button contacting member; a housing having a pressure tap connection and adapted to engage and to close the end of the body member nearest to said partition; a fluid pressure sensing unit within said housing, including a pressure responsive member, the pressure responsive member being in contact with the switch push-button contacting member; a mounting member within said housing, said mounting member adapted to slidably support the pressure responsive member; spring means associated with the pressure responsive member adapted to bias said pressure responsive member in a direction opposed to the force exerted by the pressurized fluid in said pressure tap; sealing means between the mounting member and said housing; sealing means surrounding the end portion of the pressure responsive member that comes in contact with the pressurized fluid; and electrical connections leading from the terminals of the first and second snap switches to the exterior of said body member.

8. A fluid pressure responsive switch according to claim 7 in which the spring means associated with the pressure responsive member is a helical spring associated with the pressure responsive member and said partition, to produce the biasing action.

9. A fluid pressure responsive switch according to claim 7 in which the spring means associated with the pressure responsive member is a frusto-conical washerlike spring associated with the pressure responsive member and said housing, to produce the biasing action.

10. A fluid pressure responsive switch according to claim 7 wherein the supporting member is provided with means for adjusting the force exerting by said biasing spring means against the switch push button contacting member.

11. A fluid pressure responsive switch according to claim 7 wherein the end farthest removed from said partition is provided with a caplike member adapted to engage and close the end of the body member; an electrical connector attached to said caplike member; and electrical connections leading from the terminals of said first and second snap switches to the terminals of said connector.

12. A fluid pressure responsive apparatus comprising: a body member having a transverse partition near one end thereof; a switch push-button contacting member within said body member, said switch push-button contacting member being slidably supported at one end by said partition; a housing having a pressure tap adapted to be connected to the end of the body member nearest to said partition and enclosing said switch push-button contacting member; a mounting member within said housing, said mounting member slidably supporting the opposite end portion of the switch push-button contacting member; spring means associated with the switch push-button contacting member and said partition adapted to bias said switch push-button contacting member in a direction away from said partition; a supporting member within said body member between the partition and the opposite end of the body member; a switch supporting means, said switch supporting means being slidably mounted in said supporting member; means associated with said switch supporting means and the supporting member for biasing the switch supporting means in the direction of said supporting member; means associated with the switch supporting means and the supporting member adapted to adjust the longitudinal position of said switch supporting means with respect to the supporting member; a snap switch secured to the switch supporting means, said snap switch having a push button adapted to be contacted by the switch push-button contacting member; sealing means between the mounting member and said housing; sealing means surrounding the end portion of the switch push-button contacting member that is acted upon by pressurized fluid; and electrical connections leading from said snap switch terminals to the exterior of said body member.

References Cited in the file of this patent

UNITED STATES PATENTS

| | | |
|---|---|---|
| 1,964,745 | Sauzedde | July 3, 1934 |
| 2,371,669 | Baak | Mar. 20, 1945 |
| 2,421,797 | Malone | June 10, 1947 |
| 2,716,395 | Pettigrew et al. | Aug. 30, 1955 |
| 2,766,349 | Hamburg | Oct. 9, 1956 |
| 2,790,043 | Clason | Apr. 23, 1957 |
| 2,824,919 | Davis | Feb. 25, 1958 |
| 2,837,611 | Detwiler | June 3, 1958 |

FOREIGN PATENTS

| | | |
|---|---|---|
| 775,882 | Great Britain | May 29, 1957 |